United States Patent
Deschanels et al.

(10) Patent No.: US 6,334,963 B1
(45) Date of Patent: Jan. 1, 2002

(54) ABSORBENT NEUTRONIC COMPOSITE MATERIAL AND METHOD FOR PRODUCING SAME

(75) Inventors: Xavier Deschanels, St. Victor la Coste; Philippe Bry, Palaiseau; Jean-Pierre Koci, Versailles; Bruno Provot, Meximieux, all of (FR)

(73) Assignee: Commisariat a l'Energie Atomique, Paris (FR)

( * ) Notice: Subject to any disclaimer, the term of this patent is extended or adjusted under 35 U.S.C. 154(b) by 0 days.

(21) Appl. No.: 09/582,997
(22) PCT Filed: Jan. 12, 1999
(86) PCT No.: PCT/FR99/00034
§ 371 Date: Sep. 21, 2000
§ 102(e) Date: Sep. 21, 2000
(87) PCT Pub. No.: WO99/36921
PCT Pub. Date: Jul. 22, 1999

(30) Foreign Application Priority Data

Jan. 13, 1998 (FR) .............................. 98 00240

(51) Int. Cl.[7] ................................ G21C 7/24
(52) U.S. Cl. ...................................... 252/478
(58) Field of Search ........................... 252/478

(56) References Cited

U.S. PATENT DOCUMENTS 3,565,762 A  2/1971  Nickel
5,242,622 A * 9/1993 Boutin et al. ............... 252/478

FOREIGN PATENT DOCUMENTS

| DE | 1564226 | 9/1969 |
| DE | 19546597 | 6/1996 |
| EP | 0364650 | 4/1990 |
| WO | WO94/28556 | 12/1994 |

OTHER PUBLICATIONS

Database WPI, Section Ch, Week 9102, Derwent Publications Ltd., London, GB; AN 91–012861, XP002076608, & SE 8 901091 A (ABB ATOM AB), * abrégé*.

Database WPI, Section Ch, Week 8740, Derwent Publications Ltd., London, GB; AN 87–280513, XP–002076609, & JP 62 194 497 A (NIPPON KAKU NENRYO), * abrégé*.

Bronson et al., Journal of the Electrochemical Society, vol. 139, No. 11, pp. 3183–3196, (1992),.*#jf139##

Primary Examiner—Philip Tucker
(74) Attorney, Agent, or Firm—Burns Doane Swecker & Mathis LLP

(57) ABSTRACT

The invention relates to a neutron absorbent material and a method of manufacturing such a material. The neutron absorbent material of the invention is a material having a high resistance to corrosion and high mechanical strength. This material is based on hafnium diboride and additionally comprises hafnium dioxide. The method of the invention enables one to reduce the sintering temperature of a composite material based on hafnium diboride. It includes a step that consists of mixing hafnium diboride and hafnium dioxide and a step of sintering the mixture obtained.

36 Claims, 1 Drawing Sheet

ABSORBENT NEUTRONIC COMPOSITE MATERIAL AND METHOD FOR PRODUCING SAME

DESCRIPTION

1. Technological Field of the Invention

The invention relates to a neutron absorbent composite material and a method of manufacturing this material.

Neutron absorbent materials are neutron absorbers. They find application for example, in the manufacture of control rods which are used for the control of the reactivity of nuclear reactors, notably for the control of pressurized water nuclear reactors (PWRs).

In effect, when fission of a heavy nucleus occurs in the core of a nuclear reactor, neutrons are emitted in the free state. The neutron is a projectile capable of causing fission of heavy nuclei. If among the emitted neutrons, certain of them have the opportunity of colliding with a fissile nucleus and causing its fission, they will in their turn generate descendants which themselves can cause the fission of another nucleus and give rise to further generations in a chain reaction. It is therefore clearly important to control the quantity of free neutrons formed so as to prevent the fission reaction accelerating and to keep the fission in a critical state, that is to say, in equilibrium.

Hence, control rods comprising neutron absorbent materials are movable rods mounted in the core of nuclear reactors in such a way that they are able to slide between the fuel assemblies or within the network formed by an assembly of fuel rods. Control of fission in the core is by inserting or withdrawing these rods from the core of the nuclear reactor by sliding them in and out.

Absorbent materials can be used to maintain the nuclear fission in the critical state, in which case they constitute control rods. They can be used to ensure the rapid halting of the chain reaction, in which case they then constitute safety shut-off rods.

In order to be efficient in the control of nuclear reactors, the neutron absorbent material must meet the following selection criteria it must have a high effective neutron absorption cross section, good mechanical characteristics, good chemical resistance and good dimensional stability at temperature and under irradiation.

In certain cases, the neutron absorbent material must be covered with a sheath, generally made of stainless steel. It must be chemically compatible with this sheath.

In addition, the costs of the raw materials and the cost of manufacturing the neutron absorbent material must be kept reasonable.

2. Prior Art

At the present time, the neutron absorbent materials most widely used in the control rods for pressurized light water nuclear reactors (PWRs) are boron carbide ($B_4C$), and a metal alloy of silver, indium and cadmium (SIC).

These materials have the advantage of having an effective neutron absorption cross section that meets the selection criteria for neutron absorbent materials.

The $B_4C$ absorbent material is used in the form of stacks of sintered cylindrical pellets produced from powders.

Although it is highly chemically inert, $B_4C$ oxidizes starting from 600° C. in the presence of oxygen. This compound is also sensitive to corrosion by the water in the primary PWR medium, notably when it has been irradiated by neutrons. This is one of the reasons why it is inserted into sheaths that are generally made of stainless steel.

In addition, the life of the boron carbide never reaches the theoretical limit fixed by the depletion of the boron because of damage to the material caused by the large quantity of helium and lithium formed by the absorption of neutrons. In effect, under the effect of the temperature, a part of the helium formed diffuses out of the material while the other part accumulates in it, causing swelling and micro-fractures in the material.

The combination of the swelling and the micro-fractures can cause, under strong irradiation, a mechanical interaction between the absorbent material and the steel sheath which can lead to rupture of the sheath, which is itself weakened by the fast neutron irradiation on the one hand and by the diffusion of a certain quantity of boron and carbide from the absorbent material on the other hand.

SIC absorbent materials comprise by mass about 80% silver, 15% indium and 5% cadmium. These SIC materials are used in cylindrical sheaths made of stainless steel since they have poor resistance to corrosion at the operating temperatures of nuclear reactors, in water that may incidentally contain oxygen.

SIC has good physical and chemical properties under irradiation and the modifications to which this material is subject in the course of the neutron absorption are considered to be acceptable for the control rods of present day PWRS. However, the very low melting point of this material and the cost of the silver which it contains are disadvantages that cannot be ignored for the use of this material for the control of nuclear reactors.

The materials $B_4C$ and SIC do not therefore meet the selection criteria described previously, to a satisfactory extent.

DESCRIPTION OF THE INVENTION

The precise aim of this invention is to provide a neutron absorbent material which enables one to resolve the problems described above, as well as a method of manufacturing said material.

According to the invention, the neutron absorbent material is a composite material comprising hafnium diboride and hafnium dioxide.

According to the invention, hafnium diboride can represent preferably at least 80% by volume of the material, more preferably about 90% by volume of the material.

According to the invention, hafnium dioxide can represent preferably up to 20% by volume of the material, more preferably up to 10% by volume of the material.

According to the invention, the hafnium diboride can be in the form of particles in the composite material, said particles preferably having a diameter ranging up to about 50 µm.

According to the invention, the hafnium dioxide an be in the form of particles in the composite material, said particles preferably having a diameter ranging up to about 20 µm, more preferably ranging up to about 10 µm.

According to the invention, the composite material comprising hafnium diboride and hafnium dioxide of the invention, can have a density of about 10000 to 11000 kg/m³, preferably about 10550 to 10630 kg/m³, and more preferably about 10590 kg/m³.

The neutron absorbent material conforming to the invention has the advantage of greater resistance to corrosion by the water of the primary medium in the PWR, that is to say that it contains a maximum content of 2500 ppm dissolved boron and 2.5 ppm dissolved lithium, at a temperature of about 345° C. and at a pressure of about 155 bars, this being translated as a quasi-zero dissolution of boron in the water.

Another advantage of the material according to the invention is that it keeps its integrity after a corrosion test lasting 1000 hours at a temperature of 345° C. and at a pressure of $15.5 \times 10^6$ Pa in water that is representative of that found in the primary medium of a PWR.

Another advantage of the material according to the invention has been revealed by tests carried out on a pure $HfB_2$ material at a temperature of 345° C. and at a pressure of $15.5 \times 10^6$ Pa in water that is representative of that found in the primary medium of a PWR. These tests have shown fracturing of this material caused by the formation of corrosion pits rich in oxygen called the oxide phase, within the mass of the pellet. In effect, these pits have generated internal stresses because of the density difference between the oxide phase and the boride phase, which have caused fracturing of the pellets.

In the case of the composite material according to the invention, corrosion pits are also formed but they are of much reduced size, since their development has been blocked by the presence of hafnium dioxide which has limited their propagation.

This result translates itself into increased toughness of the composite material of this invention which is greater than that of pure $HfB_2$.

The neutron absorbent composite material according to the invention can be described as comprising a homogeneous matrix of hafnium diboride ($HfB_2$) in which fine particles of hafnium dioxide ($HfO_2$) are dispersed in a homogeneous fashion.

This invention also relates to a method of manufacturing a neutron absorbent material, said neutron absorbent material being a composite material comprising hafnium diboride.

This method comprises steps that consist of, in this order:

adding hafnium dioxide powder to hafnium diboride powder, mixing the hafnium diboride powder and the hafnium dioxide powder in a way that produces a homogeneous mixture, and sintering the homogeneous mixture in a way that produces the composite material.

According to the method of the invention, up to 20% by volume of hafnium dioxide, preferably about 10% by volume of hafnium dioxide, can be added, the homogeneous mixture of hafnium diboride and hafnium dioxide powders representing 100% by volume.

According to the method of the invention, the hafnium diboride powder can have a particle size preferably ranging up to about 50 $\mu$m.

According to the method of the invention, the hafnium dioxide powder can have a particle size preferably ranging up to about 20 $\mu$m, more preferably up to about 10 $\mu$m.

According to the method of the invention, the mixture of the hafnium diboride powder and the hafnium dioxide can be produced by any method known to a man skilled in the art to obtain a homogeneous mixture of such powders. Preferably, the mixture of these powders can be produced by application of ultra-sound to a slip comprising said powders dispersed in a dispersion liquid.

The dispersion liquid is preferably a liquid which after the mixing of the powders, may be easily removed, for example, by evaporation. This dispersion liquid may be, for example, an alcohol such as ethanol.

As soon as a homogeneous mixture is obtained, it can be dried, for example by evaporation of the alcohol and then it can be sieved so as to remove any possible aggregates of powder in the mixture.

The homogeneous mixture obtained is then sintered in order to obtain the composite material.

According to the invention, the sintering can be carried out under vacuum.

According to the invention, the mixture can be sintered in any mold suitable for sintering such powders, for example a graphite mold preferably lined by a sheet of graphite.

Lining the mold enables one to avoid diffusion of chemical species from the mixture to the mold and facilitates the subsequent stripping of the composite material from the mold.

The mold can, for example, have a shape suitable for the molding of the material in the form of a pellet, plate, cross, rod and in a general way a shape suitable to constitute control rods for a nuclear reactor.

Sintering of the mixture is carried out under conditions of temperature, pressure and duration that permit appropriate densification of the two materials. It can, for example, be carried out at a temperature of about 1600 to 2100° C., preferably at a temperature of about 1900° C., under a pressure of 10 to 100 MPa, preferably about 83 MPa, for a period of about 15 to 90 minutes, preferably about 1 hour, for example in a furnace held under a dynamic vacuum.

Following this sintering, or heat treatment, the composite material obtained can be machined, for example, using diamond tipped tools. In effect, the cortical area of the composite material can have fine fissures due to a chemical reaction between the oxide $HfO_2$ present in the material and the mold, for example, a graphite mold. This cortical area can be removed by machining over a thickness of from 500 to 1000 $\mu$m, preferably 750 $\mu$m.

The method of the invention notably permits a reduction in the sintering temperature of the composite material of about 200° C. compared with that for pure hafnium diboride.

Other characteristics and advantages will better become apparent on reading the following example that makes reference to the appended drawings, which is given, it is understood, for information purposes only and which is non-limitative.

EXAMPLES

Example 1

Manufacture of a Composite Material According to the Invention 90.9 g of hafnium diboride powder with a mean particle size less than 50 $\mu$m and 9.1 g of hafnium dioxide powder with a mean particle size less than 20 $\mu$m were mixed, being 90% by volume of hafnium diboride and 10% by volume of hafnium dioxide.

The mixing was carried out to be as homogeneous as possible by the application of ultrasound to a slip made up of the two powders dispersed in ethanol.

The mixture was then dried in an oven heated to 80° C. and then sieved with a sieve having a mesh size of 60 microns. A mass of 8 g of the mixture was put into a graphite mold 9.5 mm in diameter. Two graphite pistons closed off the ends of the mold previously lined with a sheet of graphite and allowed pressure to be applied to the powder.

The mixture and mold assembly was brought to a temperature of 1900° C. under a pressure of 83 MPa for one hour in an oven maintained under a dynamic vacuum. Pellets were obtained 9.5 mm in diameter and 12 mm high.

The cortical area of these pellets had fine fissures due to a chemical reaction between $HfO_2$ present in the mixture and the graphite of the mold. This cortical area was removed by machining using diamond tipped tools over a thickness of 750 microns for the cylindrical surface and over a thickness of 1000 microns for the ends.

The pellets obtained had a final density equal to 95% of the theoretical density, namely a density of 10590 kg/m$^3$.

Example 2
Influence of the Quantity of Hafnium Dioxide on the Sintering Temperature of a Mixture of $HfB_2$ and HfO2 According to the Invention Under the same conditions as those in Example 1, different mixtures of hafnium diboride and hafnium dioxide powders comprising 0, 5, 10 and 20% by volume of hafnium dioxide were sintered and the density of the composite material obtained was measured as a function of the sintering temperature of these different mixtures.

For each mixture, a relative density (rd) of the composite material obtained after sintering, was calculated as a % by calculating the ratio of the measured density and the theoretical density after sintering.

Table 1 below brings together the results from this example.

TABLE 1

| Sintering temperature in ° C. | 1700 | 1800 | 1850 | 1900 | 2000 | 2100 |
|---|---|---|---|---|---|---|
| rd (%) $HfO_2$ 0% by volume | — | — | — | 74 | 91 | 96 |
| rd (%) $HfO_2$ 5% by volume | — | — | — | 87 | 93 | — |
| rd (%) $HfO_2$ 10% by volume | 76 | 89 | — | 95 | — | — |
| rd (%) $HfO_2$ 20% by volume | 81 | 93 | 97 | — | — | — |

Figure 1:
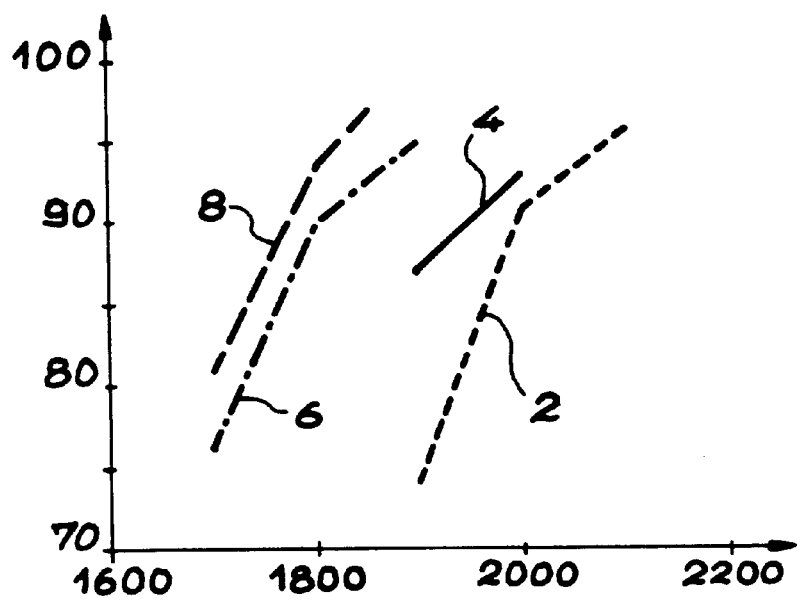
FIG. 1 is a graphical representation of the influence of the $HfO_2$ content on the sintering temperature for a mixture of $HfB_2$ and $HfO_2$ powders according to the invention.

In FIG. 1, the values in Table 1 are reported in such a way that a graph is constructed of the relative density (%) of the composite material as a function of the temperature for a concentration of 0% $HfO_2$ by volume in the mixture curve reference number 2, for 5% $HfO_2$ in the mixture:curve reference number 4, for 10% $HfO_2$ in the mixture curve reference number 6, for 20% $HfO_2$ in the mixture:curve reference number 8. This Figure reveals the influence of the $HfO_2$ content on the sintering temperature of a mixture of $HfB_2$ and $HfO_2$ powders according to the invention.

The results from this example show in particular that a pure $HfB_2$ powder requires, in order to be sintered, a temperature about 200° C. higher than that necessary for a mixture of hafnium diboride and 10% by volume of hafnium dioxide.

These results show in a more general way that when one increases the $HfO_2$ content in a mixture of $HfB_2$ and $HfO_2$ powders, one lowers the sintering temperature.

Measurements have shown that, depending on the sintering parameters used, that is to say the pressure, the temperature and the duration, the pellets formed can have a relative density which varies between 80 and 99% of the theoretical density of the starting mixture.

Example 3
Corrosion Kinetics of a Material According to the Invention

Corrosion tests were carried out under conditions representative of those for the water of a primary medium in a PWR type reactor, that is to say at a temperature of 345° C. and a pressure of 155 bars.

These tests were carried out in an autoclave, on composite materials according to the invention and comprising 0% $HfO_2$ by volume for the tests designated below tests 1, 10% $HfO_2$ by volume for the tests designated below tests 2, 20% $HfO_2$ by volume for the tests designated below tests 3.

Table 2 below brings together the results of the measurements obtained in this example.

TABLE 2

| duration in hours | | 0 | 200 | 400 | 600 | 800 | 1000 |
|---|---|---|---|---|---|---|---|
| TESTS 1 | | | | | | | |
| 0% $HfO_2$ by volume | % boron dissolved | 0 | 0 | 0.7 | — | 13 | — |
| TESTS 2 | | | | | | | |
| 10% $HfO_2$ by volume | % boron dissolved | 0 | 0 | 0.3 | 0.6 | 0.9 | 2 |
| TESTS 3 | | | | | | | |
| 20% $HfO_2$ by volume | % boron dissolved | 0 | — | 0.1 | — | 0.4 | — |

Figure 2:
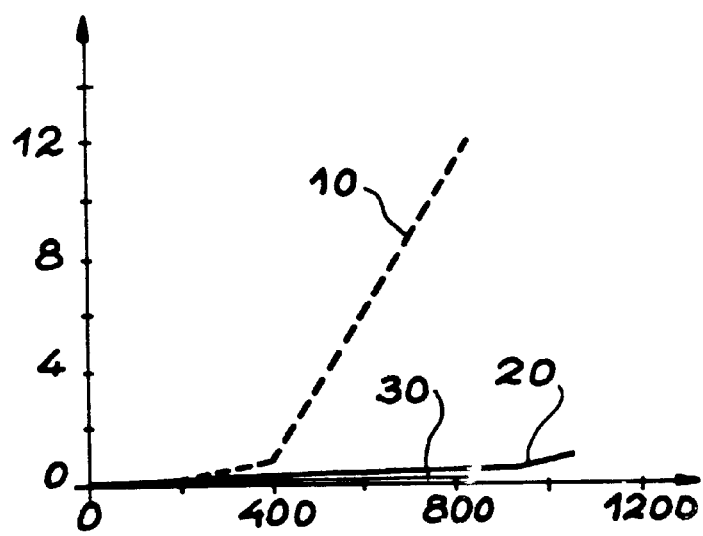
FIG. 2 is a graphical representation of the corrosion kinetics of pure hafnium diboride and of materials according to the invention.

FIG. 2 is a graphical representation of the results in Table 2.

In this FIG. 2, the tests 1 correspond to curve reference number 10, the tests 2 correspond to curve reference number 20 the tests 3 correspond to curve reference number 30.

These tests show that in the case of the composite material according to the invention, that is to say comprising a $HfB_2$ and $HfO_2$ mixture, there is a quasi-zero dissolution of boron in the water.

The $HfB_2$/$HfO_2$ composite according to the invention there shows better corrosion behavior in the water than pure $HfB_2$.

Example 4
Measurement of the Toughness of a Material According to the Invention

The toughness is the macroscopic value that characterizes the resistance to the propagation of the fissures in a material. It is concerned with the critical value of the calculated stress intensity factor at a pre-fissure introduced into the material being investigated (creating in this way a critical defect of a size much greater than that of the other defects existing naturally in the test piece).

The double torsion test chosen in our case to measure the toughness consists of making a 3 mm notch in a rectangular plate (length 35 mm×width 17 mm×thickness 2 mm) and refining the center of this notch by successive Knoop indentations along the long median axis of the test piece. The characteristics of the defect created in this way must be as close as possible to those of a natural defect, and in particular, the radius of curvature at the bottom of the notch must be very small. The fissure is initiated under the point of application of the load from the pre-fissure and is propagated along the axis of the test piece.

The test then consists of applying three point bending forces to the end of the plate in a way that causes the opening of the fissure to proceed in order to bring about its propagation while controlling the stress applied and recording the displacement under the end of the notch. The plate rests on four point supports and the load is transmitted by a point at the end of the pre-fissure.

The test procedure consists of applying to the test piece, a deflection which increases at a constant rate (5 μm/min.).

The measurement of the critical load Pc that causes propagation of the fissure then allows one to calculate the toughness.

TABLE 3

Toughness of the two materials

| Materials | Toughness $K_{IC}$ $10^6$ (Pa/m$^{05}$) |
|---|---|
| HfB$_2$ | 3.15 |
| HfB$_2$ + 10% HfO$_2$ | 5.1 |

These results show greater toughness for the composite material HfB$_2$/HfO$_2$ than for a pure HfB$_2$ material.

What is claimed is:

1. Neutron adsorbent material, characterized in that said material is a composite material comprising hafnium diboride and hafnium dioxide, in which the hafnium diboride represents at least 80% by volume of the material.

2. Material according to claim 1, in which the hafnium diboride represents about 90% by volume of the material.

3. Neutron adsorbent material, characterized in that said material is a composite material consisting of at least 80% by volume hafnium diboride and up to 20% by volume hafnium dioxide.

4. Material according to claim 1, in which the hafnium dioxide represents up to 20% by volume of the material.

5. Neutron adsorbent material, characterized in that said material is a composite material comprising hafnium diboride and hafnium dioxide, in which the hafnium dioxide represents about 10% by volume of the material.

6. Material according to claim 1, in which the hafnium dioxide represents about 10% by volume of the material.

7. Material according to claim 2, in which the hafnium dioxide represents about 10% by volume of the material.

8. Method of manufacturing a neutron absorbent material, said neutron absorbent material being a composite material hafnium diboride, said method comprising steps that consist of, in this order:
    adding hafnium dioxide powder to hafnium diboride powder,
    mixing the hafnium diboride powder and the hafnium dioxide powder in a way that produces a homogeneous mixture, wherein when up to 20% by volume of hafnium dioxide is added, the homogeneous mixture of the hafnium diboride and hafnium dioxide represent 100% by volume and
    sintering the homogeneous mixture in a way that produces the composite material.

9. Method according to claim 8, in which, about 10% by volume of hafnium dioxide is added, the homogeneous mixture of the hafnium diboride and hafnium dioxide representing 100% by volume.

10. Method according to claim 8, in which the hafnium diboride powder has a particle size ranging up to about 50 μm.

11. Method according to claim 9, in which the hafnium diboride powder has a particle size ranging up to about 50 μm.

12. Method according to claim 10, in which the hafnium diboride powder has a particle size ranging up to about 20 μm.

13. Method according to claim 11, in which the hafnium diboride powder has a particle size ranging up to about 20 μm.

14. Method according to claim 10, in which the hafnium diboride powder has a particle size ranging up to about 10 μm.

15. Method according to claim 11, in which the hafnium diboride powder has a particle size ranging up to about 10 μm.

16. Method according to claim 8, in which the mixture of the hafnium diboride powder and hafnium dioxide powder is produced by the application of ultrasound to a slip comprising said powders dispersed in a dispersion liquid.

17. Method according to claim 8, in which the homogeneous mixture is sintered under vacuum.

18. Method according to claim 8, in which the homogeneous mixture is sintered in a graphite mold lined with a sheet of graphite.

19. Method according to claim 17, in which the homogeneous mixture is sintered in a graphite mold lined with a sheet of graphite.

20. Method according to claim 8, in which the mixture is sintered at a temperature of from about 1600 to 2100° C., under a pressure of from 15 to 100 MPa for a period of about 15 to 90 minutes.

21. Method according to claim 8, in which the mixture is sintered at a temperature of about 1900° C., under a pressure of about 83 MPa for a period of about 1 hour.

22. Method according to claim 8, comprising additionally a step of machining the composite material over a thickness of about 500 to 1000 μm.

23. Material according to claim 7, in which the hafnium dioxide is in the form of particles having a diameter ranging up to about 50 μm.

24. Material according to claim 7, in which the hafnium dioxide is in the form of particles having a diameter ranging up to about 20 μm.

25. Material according to claim 7, in which the hafnium dioxide is in the form of particles having a diameter ranging up to about 10 μm.

26. Method according to claim 17, in which the mixture is sintered at a temperature of from about 1600 to 2100° C., under a pressure of from 15 to 100 MPa for a period of about 15 to 90 minutes.

27. Method according to claim 17, in which the mixture is sintered at a temperature of about 1900° C., under a pressure of about 83 MPa for a period of about 1 hour.

28. Material according to claim 3, in which the hafnium dioxide represents about 10% by volume of the material.

29. Material according to claim 1, in which the hafnium dioxide is in the form of particles having a diameter ranging up to about 50 μm.

30. Material according to claim 29, in which the hafnium dioxide is in the form of particles having a diameter ranging up to about 20 μm.

31. Material according to claim 29, in which the hafnium dioxide is in the form of particles having a diameter ranging up to about 10 μm.

32. Material according to claim 3, in which the hafnium dioxide is in the form of particles having a diameter ranging up to about 50 μm.

33. Material according to claim 32, in which the hafnium dioxide is in the form of particles having a diameter ranging up to about 20 μm.

34. Material according to claim 32, in which the hafnium dioxide is in the form of particles having a diameter ranging up to about 10 μm.

35. Material according to claim 1, having a density of about 10000 to 11000 kg/m$^3$.

36. Material according to claim 35, having a density of about 10550 to 10630 kg/m$^3$.

* * * * *